Aug. 24, 1926.

G. MENGDEN 1,596,936

CASE OR HOLDER FOR MAPS AND PLANS

Filed April 27, 1925        5 Sheets-Sheet 1

Inventor
G. Mengden
By Marko Clerk
Attys.

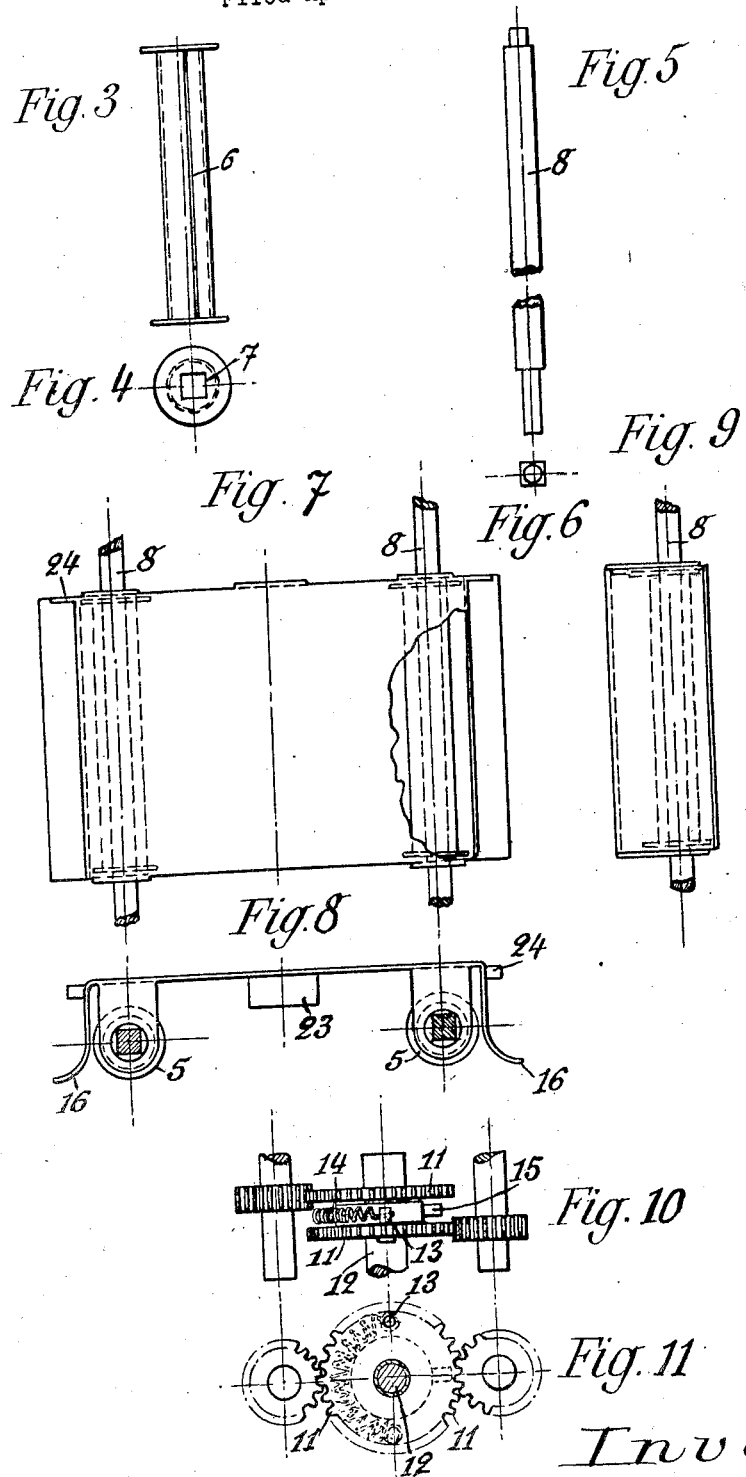

Aug. 24, 1926.

G. MENGDEN 1,596,936

CASE OR HOLDER FOR MAPS AND PLANS

Filed April 27, 1925    5 Sheets-Sheet 3

Inventor
G. Mengden
By Marks & Clerk
Attys

Aug. 24, 1926. 1,596,936
G. MENGDEN
CASE OR HOLDER FOR MAPS AND PLANS
Filed April 27, 1925    5 Sheets-Sheet 4

Inventor
G. Mengden
By Marks Clark
Attys.

Aug. 24, 1926.
G. MENGDEN
1,596,936
CASE OR HOLDER FOR MAPS AND PLANS
Filed April 27, 1925      5 Sheets-Sheet 5
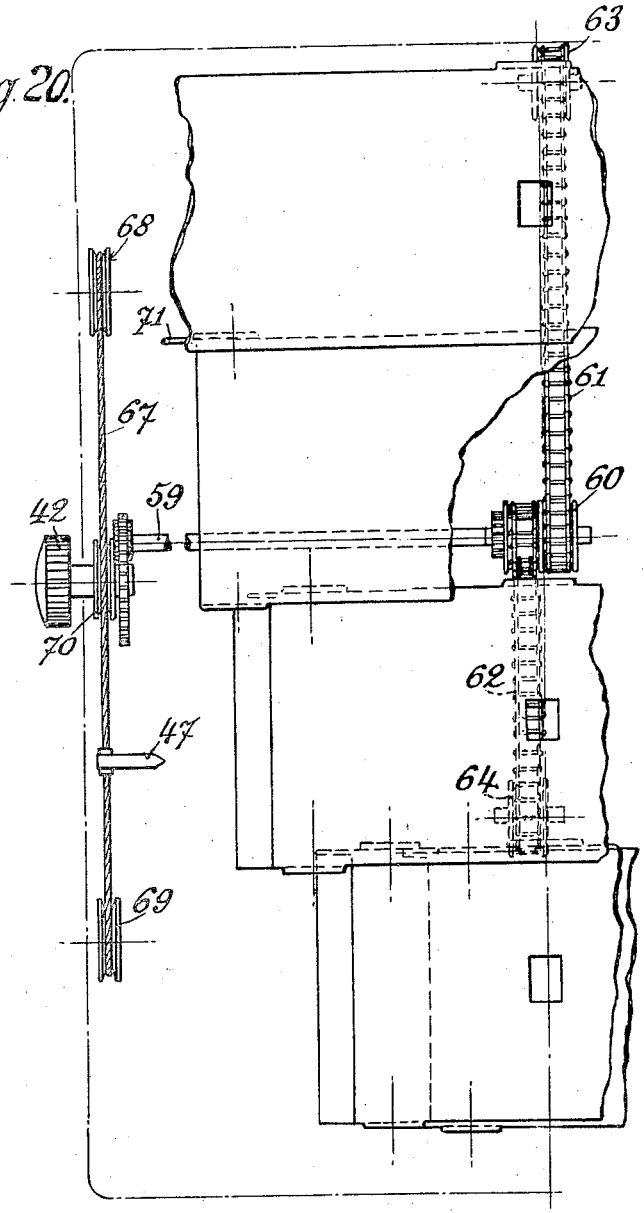
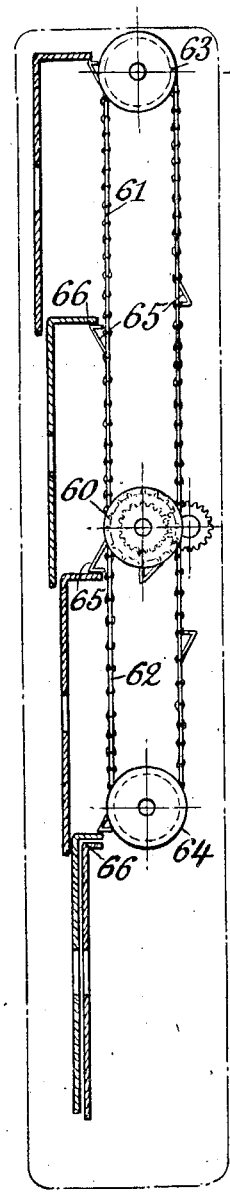
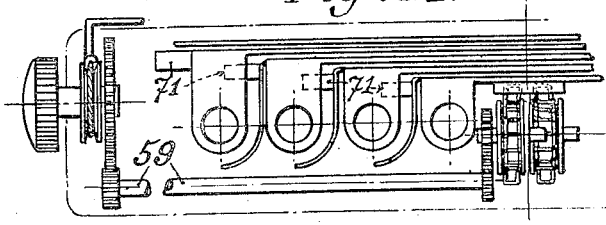
Inventor
G. Mengden
By Marks Clerk
Attys.

Patented Aug. 24, 1926.

1,596,936

UNITED STATES PATENT OFFICE.

GEORGES MENGDEN, OF MELZ-SUR-SEINE, FRANCE.

CASE OR HOLDER FOR MAPS AND PLANS.

Application filed April 27, 1925, Serial No. 26,254, and in France May 10, 1924.

The cases containing sets of maps which are in current use are disadvantageous from the fact that the maps must be constantly withdrawn from their case, and are handled, folded and unfolded, and are thus subject to damage and particularly in bad weather.

The known cases with rolling maps comprise a relatively narrow map which shows but a single itinerary and requires the preliminary choice and preparation of the map—for instance aviation maps—or require more or less complicated manipulations whereby the exact orientation is made difficult if not impossible.

My invention obviates all such drawbacks, and it consists of a metal case of small size adapted to contain a large-sized map which may be unrolled or otherwise displaced in a continuous manner in all directions and below the transparent sheet of the said case, by means of a pair of knobs.

The said map consists of a plurality of superposed sections or bands of uniform width, each of the said bands being wound upon a corresponding roller, and the longitudinal motion of the map is produced by the simultaneous rotation of the said rollers in a given direction, certain rollers serving to wind up the map and the others for the unwinding. Each pair of rollers corresponding to a map band can further be displaced in the axial direction of the rollers, and the successive movement of the different bands in this direction corresponds to the transverse motion of the map. The said movements are produced by means of two knobs and may take place at the same time.

In order that the orientation and search for a given locality on the large map may be easily and rapidly performed, I utilize an auxiliary map representing the same region as the large map but on a smaller scale and omitting all but the important localities.

The appended drawings show by way of example an embodiment of my said invention.

Figs. 3 and 4 are respective side and end views of one of the map rollers, and Figs. 5 and 6 are like views of a roller shaft.

Figs. 7, 8, 9 show respectively in front and side elevation and in plan view the arrangement of each pair of rollers carrying a map band.

Figs. 10 and 11 are respective elevational and plan views of the control gears on a larger scale.

Fig. 15 is the corresponding elevational view, Fig. 16 the vertical section and Fig. 17 the horizontal section.

Fig. 20 is a general elevational view of the combination of plates connecting the pairs of rollers, and of the controlling mechanism.

Fig. 21 is the corresponding plan view and Fig. 22 a view of the under part.

Figure 1:
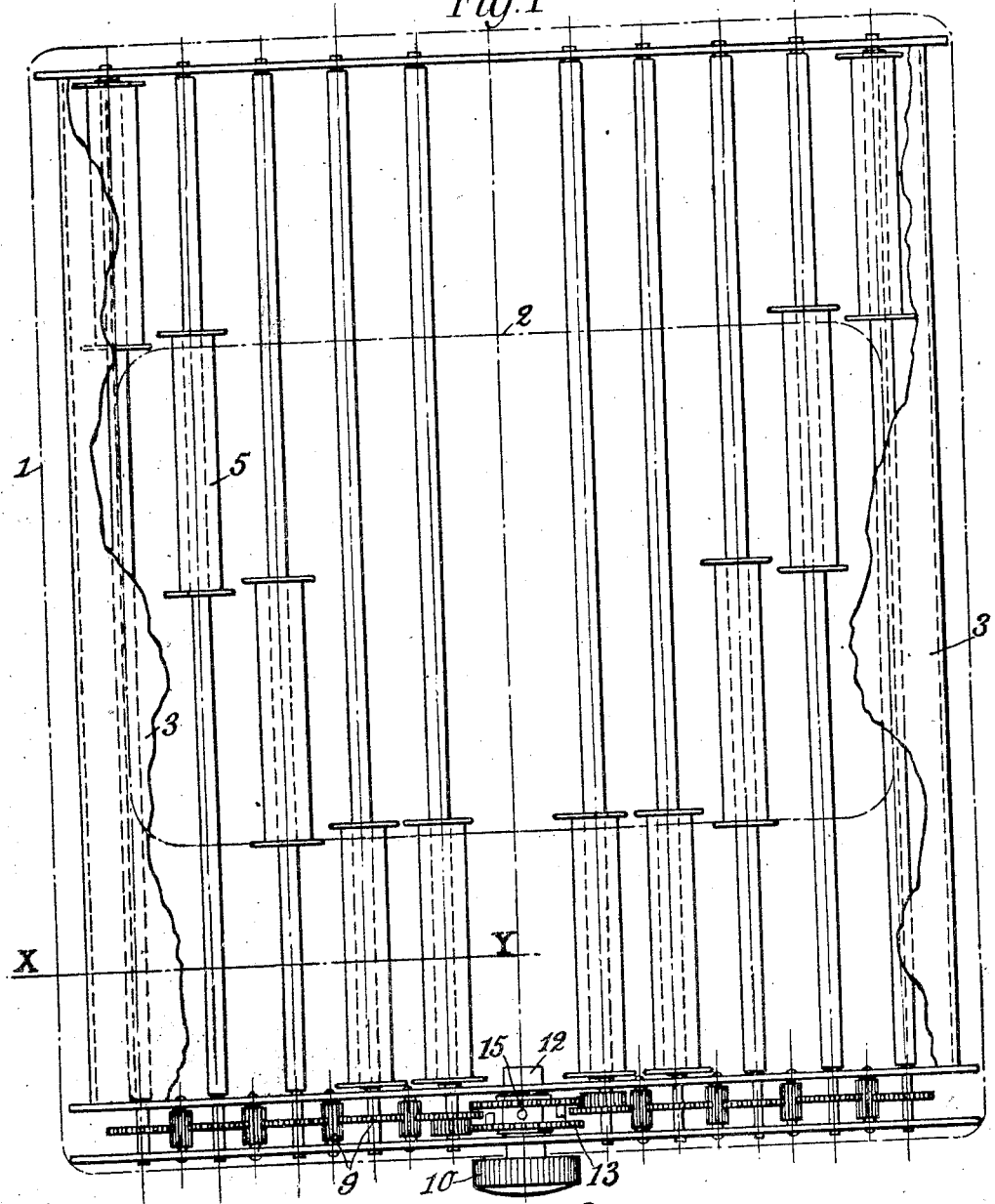
Fig. 1 is a diagrammatic elevational view of the device in which the casing has been shown in dotted lines and the map sections and plates have been omitted.

As shown in Fig. 1, the outline of the said map case (or envelope) is shown by the dot and dash lines 1, and the outline of the aperture in the cover of said case by the line 2.

The device comprises a main plate 3 (Fig. 1), with the middle portion shown as partially broken away; said plate is curved downwardly at the edges (Fig. 2) and serves to support and to guide the map bands. The said map bands, which are superposed, are not shown in Fig. 1, but their position is indicated by the dot and dash lines, Fig. 2.

The ends of the map bands are wound upon the rollers 5 (Figs. 1 and 2) which are mounted below the said main plate. The rollers 5 are separately represented in Fig. 3, and may consist for example of sheet aluminium or tin plate. In each roller is a slot 6 for the insertion of the end of the map band whereby the latter is held upon the said roller. At the ends of each roller is a square aperture 7.

The said rollers are mounted on the shafts 8 (Figs. 1 and 5) of square section, and are slidable on the said shafts. A simultaneous rotation in the same direction may be imparted to all the shafts with their rollers, by means of the gearing 9 (Figs. 1 and 2) by turning the knob 10, so as to wind all the map bands upon the rollers on one side of the device, the bands being unwound in like manner from the rollers on the other side, and inversely when the said knob is turned in the contrary direction.

When this movement takes place, the diameter of the winding cylinder will vary according to the thickness of the paper thereon, and to provide a regular tension for the map bands, the rate of rotation of the winding and unwinding rollers must be varied; for this purpose I employ a very simple means which is shown on a larger scale in Figs. 10 and 11.

The two gear wheels 11 are loosely revoluble on the shaft 12 (Fig. 10) of the knob 10, not shown. Each gear wheel carries a stud 13, and the latter are connected together by a spring 14 urging the said gear wheels in the contrary direction; this tendency is imparted to the said rollers, thus properly stretching the map band. The shaft of the said knob carries a stud 5 which enters into contact with a stud 13 mounted on one of the gear wheels 11 upon rotating the said knob. The said gearing will thus rotate the roller shafts, thus moving the map band, while at the same time allowing the unwinding rollers to turn in the same direction at a variable speed under the effect of the tension of the map bands due to the spring 14. A like effect is produced when the knob 10 is turned in the contrary direction, the map bands being always stretched, and the map is moved in the opposite direction by the same knob.

Figure 2:
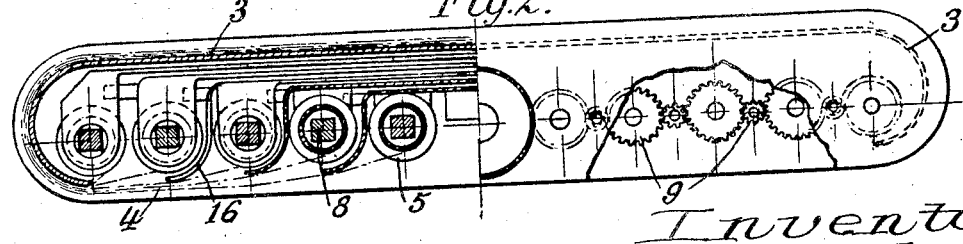
Fig. 2 is a half section of the same on the line X—Y of Fig. 1 and a half plan view of the lower part.

Each pair of rollers carrying a given band are connected together by sheet metal plates 16 (Fig. 7 to 9) which are mounted upon the rollers 5 while bearing upon the shafts 8 and insuring the simultaneous lengthwise displacement of the pair of rollers. The ends of the plate 16 serve to guide the said map bands. The said plates are not shown in Fig. 1, but are shown in Fig. 2.

Figure 13:
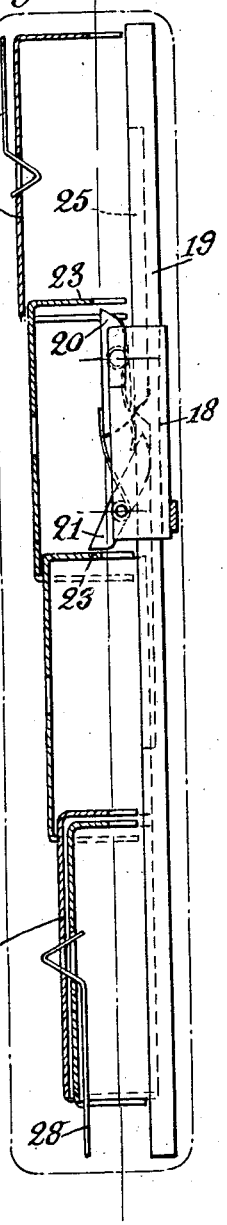
Fig. 13 is the corresponding vertical section, and Fig. 14 the plan view.
Figure 14:
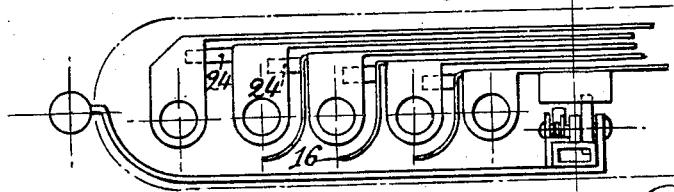

The map bands are moved in the axial direction of the rollers by means of the knob 17 (Fig. 12) which is mounted on the end of a lever secured to a double pawl 18 which is slidable on a support 19 consisting of a square tube; when the said knob is in the middle position, the two pawls 20 and 21 are disengaged. For the descent of the map, the said knob is pushed in the direction of the arrow. The outer end of the pawl 21 descends under the action of a spring into the slot 22 in the support 19, thus pivoting the said pawl whose end comes into contact with the hook 23 (Figs. 8 and 13) of the plate connecting together a given pair of rollers, thus moving the same with the corresponding map band. When the edge of said map band comes near the edge of the immediately underlying map band—leaving however a small margin of a few millimeters—the plate connecting the first pair of rollers will be engaged by means of its hooks 24 (Figs. 12 and 14) with the plate connecting the following pair of rollers, and will draw this pair together with the corresponding map band into the place of the first pair of rollers. To continue the movement of the map band, the knob 17 is first raised and then lowered, and so on. During this time the second pawl 20 remains in the disappearing and inoperative position.

To move the said map band in the contrary or the upward direction, the knob 17 is pushed from its middle position to the top. The second pawl 20 now becomes operative; its outer end drops into the slot 25, and the first-mentioned pawl 21 leaves its slot in the support 19 and remains in the disappearing position. By repeating this upward motion of said knob from the middle position, the entire map can be raised by bringing its successive bands into coincidence with the said aperture in the cover of the map case. The map bands occupying the end positions such as 26 and 27 (Figs. 12 and 13) will be concealed by the ends of the case cover and will be held in place by the springs 28 (Fig. 13) which enter into suitable apertures in each of the plates connecting together the pairs of rollers.

Figure 15:
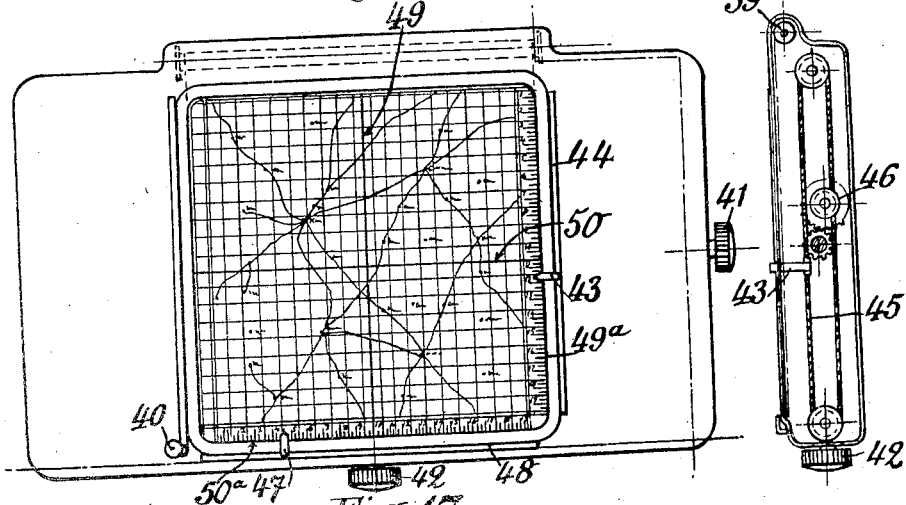
Figs. 15 to 17 show a map case comprising an auxiliary matching map.
Figure 16:
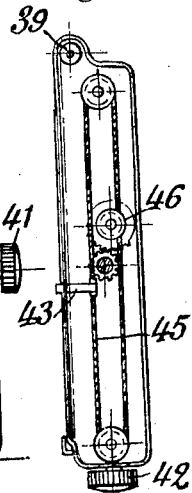
Figure 17:
Figure 18:
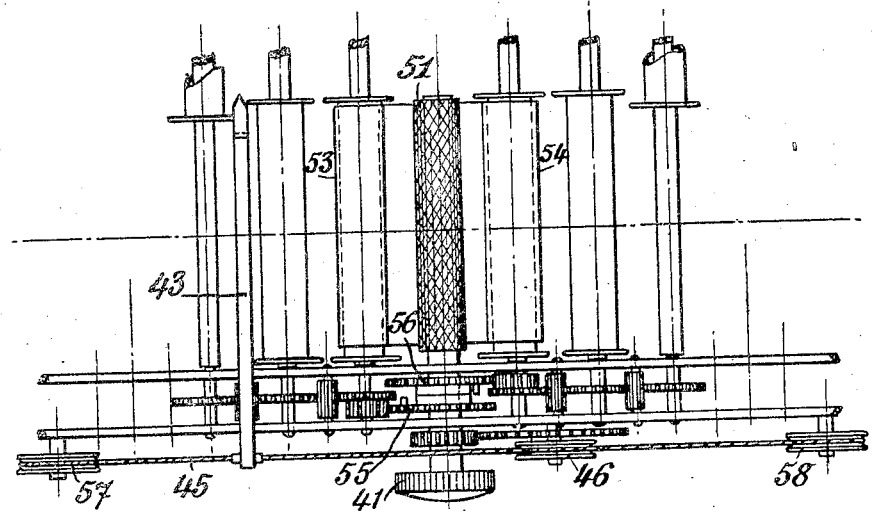
Figs. 18 and 19 are respective elevational and plan views on a larger scale of the map rollers.
Figure 19:
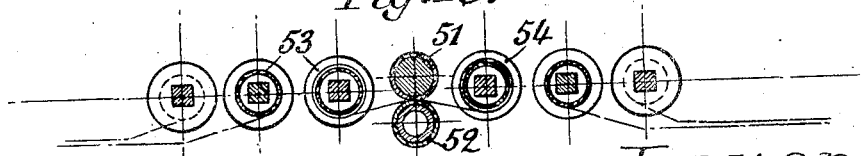

In Figs. 15 to 22, the small map is disposed upon the roller 39 (Fig. 16) in the upper part of the case, and may be unwound below the transparent sheet by means of the knob 40, thus covering the visible part of the principal map, Fig. 15. The latter is displaced in the meridian direction by turning the milled knob 41 and in the direction of the parallels by turning the knob 42. The pointer 43 is slidable along the slot 44 and is secured to the cable 45 (Figs. 16 to 18); it passes around the pulley 46 which is connected by gearing with the shaft of the knob 41.

The ratio of said gearing is inversely proportional to the ratio of the scales of the main map and the small map; when the main map is displaced by means of the knob 41 through a given distance, the pointer 43 will move in the contrary direction through the same distance along the small map. The same ratio prevails between the motion of the detail map in the direction of the parallels, and the pointer 47 which is slidable along the slot 48 is moved by like means. When the small map is lowered, the pointers 43 and 46 indicate thereon a given point according to the position of said pointers (principle of rectilinear co-ordinates). The corresponding point on the main map is obtained in such manner as to coincide with the intersection of two stationary indicating lines 49 and 50 formed on the said transparent sheet.

I am thus enabled to rapidly find the desired point upon the large detail map, in the following cases:

1. When the desired point is situated within a given region or near a town of some size, and is indicated on the small map, the latter is lowered by means of the knob 40. The pointers 43 and 47 are moved by the respective knobs 41 and 43 so as to indicate the desired region. The small map is now raised, thus uncovering the desired region upon the detail map which had been moved during the preceding operation, with the pointers 43 and 47.

2. When the position of the desired point is unknown, it may be found by the use of an alphabetic indicator in the form of a booklet containing all the notation found on the detail map, followed in each case by two indicating numbers. These numbers are also printed along the two edges 49ᵃ and 50ᵃ of the small map. The latter is now lowered, and the pointers placed on the numbers which show the general position of the point sought for upon the small map. When the latter is raised, this will uncover the detail map, which had been displaced during the preceding operation, and the desired point is now shown by the intersection of the lines 49 and 50 on the transparent sheet.

To obtain the forward motion of the main map by rotating the knobs 41 and 42, so that their ratio of movement shall be constant, I modify the mechanism of the map case which was last described, as follows.

The shaft of the knob 41 (Fig. 18) serving to wind and unwind the bands of the main map and to move the latter in the meridian directions, is extended within the map case and forms a friction cylinder 51 coacting with a like cylinder 52 placed below (Fig. 19); both cylinders are rubber covered; the pair of rollers 53 and 54 nearest the knob 41 carry a paper band which is inserted between the cylinders 51 and 52, the thickness of said band being the same as that of the paper of the main map. The said band serves to impart the rotation of the cylinder 51 to the shafts of the rollers 53 and 54, the band being constantly under a strong tension due to the spring (not shown) connecting together the gear wheels 55 and 56 which rotate loosely on the shaft of the knob 41.

The stud 15 (Fig. 1) is dispensed with; the rotation of the shafts carrying the rollers 53 and 54 is imparted to the other shafts, by means of the gearing connecting the same. The cable 45 (Fig. 29) operates the pointer 43 and is disposed upon the loose pulleys 57, 58 and on the pulley 46 which is connected by gearing with the shaft of the knob 41.

Figure 12:
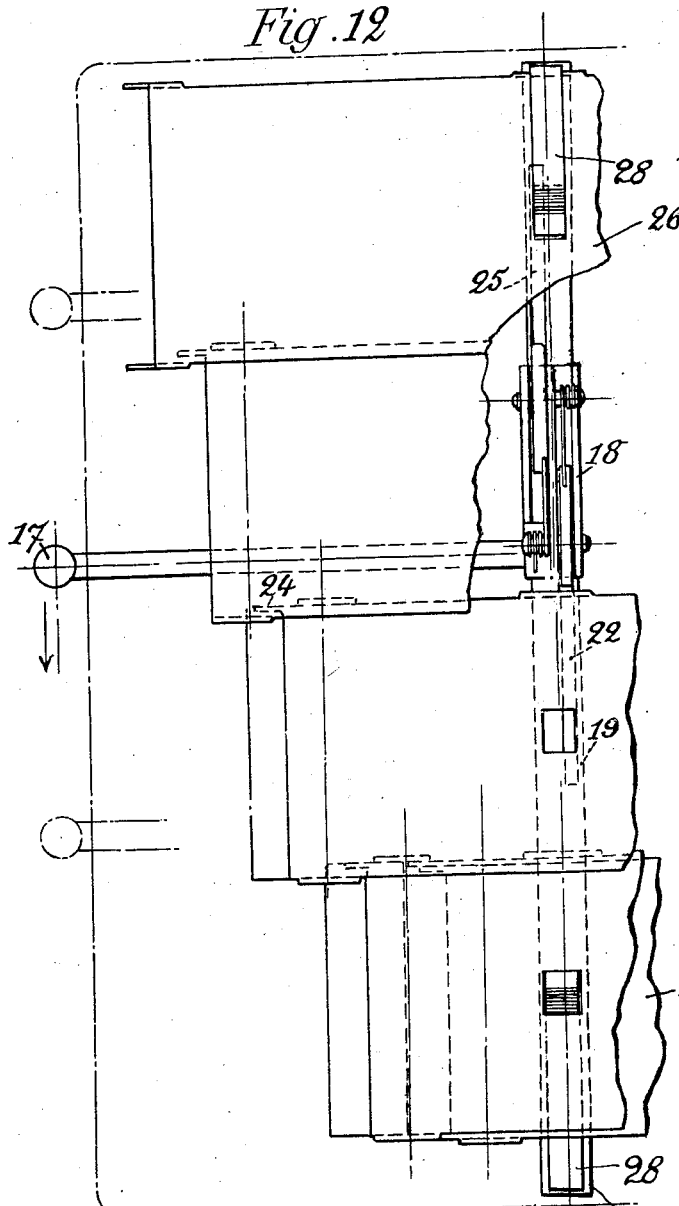
Fig. 12 is an elevational view of the arrangement of the plates which connect the rollers together in pairs.

The displacement of the main map in the direction of the parallels—i. e. in the axial direction of the rollers—is effected by the rotation of the knob 42 (Fig. 20) which is herein substituted for the knob of the pawl lever 17 (Fig. 12). The rotation of the knob 42 is imparted through the medium of suitable gearing and an intermediate shaft 59 to a double chain wheel 60 carrying two chains provided with hooks 61 and 62, these being stretched by the two loose pulleys 63 and 64. The hooks 65 disposed upon the said chain will butt against the hooks 66 of the plates which connect the said rollers together in pairs, thus moving the said plates in either direction according to the direction of rotation of the wheel 60.

Each of the said plates will be coupled to the following plate by means of the hooks 71 (Fig. 22) thus moving the latter in succession. The cable 67 (Fig. 20) controls the pointer 47 and is disposed upon the two loose pulleys 68 and 69 and on the pulley 70 keyed to the shaft of the knob 42.

Having thus described my apparatus, what I claim as new therein, and my own invention, is:—

1. In a map case of small size which is adapted to contain a large-sized map which may be employed without removal from the said case, the combination of a map separated into bands adapted for superposition, various pairs of rollers, the rollers of each pair being slidable lengthwise and adapted for the insertion of the respective ends of one of the map bands, controlling means connecting all of the said rollers together in order to afford their simultaneous rotation in a given direction, two control knobs serving for the displacement of the map in the two cardinal directions, said map case having therein an aperture for the observation of the said map.

2. In a map case of small size which is adapted to contain a large-sized map which may be employed without removal from the said case, the combination of a map separated into bands adapted for superposition, various pairs of rollers, the rollers of each pair being slidable lengthwise and adapted for the insertion of the respective ends of one of the map bands, controlling means connecting all of the said rollers together in order to afford their simultaneous rotation in a given direction, two control knobs serving for the displacement of the map in the two cardinal directions, said map case having therein an aperture for the observation of the said map, one of the two control knobs serving to effect the sliding of the said rollers concurrently with the lateral displacement of the said map, two separate pawls connected with the said control knob and serving to bring the said map bands successively into coincidence with the said observation aperture, the lateral and longitudinal displacement of the said map being simultaneously effected.

3. In a map case of small size which is adapted to contain a large-sized map which may be employed without removal from the said case, the combination of a map separated into bands adapted for superposition, various pairs of rollers, the rollers of each pair being slidable lengthwise and adapted for the insertion of the respective ends of one of the map bands, controlling means connecting all of the said rollers together in order to afford their simultaneous rotation in a given direction, two control knobs serving for the displacement of the map in the two cardinal directions, said map case having therein an aperture for the observation of the said map, which may be displaced without breaking the continuity, the map bands which are not in use being so disposed as to be concealed from view.

In testimony whereof I have hereunto affixed my signature.

GEORGES MENGDEN.